(12) United States Patent
Spiro (10) Patent No.: US 8,605,359 B2
(45) Date of Patent: *Dec. 10, 2013

(54) LENTICULAR PRODUCT

(75) Inventor: Steven Spiro, Chappaqua, NY (US)

(73) Assignee: Tracer Imaging LLC, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,197

(22) Filed: Sep. 11, 2012

(65) Prior Publication Data

US 2013/0063825 A1    Mar. 14, 2013

Related U.S. Application Data

(63) Continuation of application No. 12/753,133, filed on Apr. 2, 2010, now Pat. No. 8,284,491, which is a continuation-in-part of application No. 12/142,976, filed on Jun. 20, 2008, now Pat. No. 8,310,761.

(60) Provisional application No. 60/945,657, filed on Jun. 22, 2007.

(51) Int. Cl.
*G02B 27/10*    (2006.01)
*G02B 25/02*    (2006.01)

(52) U.S. Cl.
USPC ............................................ 359/619; 40/454

(58) Field of Classification Search
USPC ............................................ 359/619; 40/454
See application file for complete search history.

(56) References Cited

U.S. PATENT DOCUMENTS 8,284,491 B2 * 10/2012 Spiro ........................... 359/619
8,310,761 B1 * 11/2012 Spiro ........................... 359/620

* cited by examiner

*Primary Examiner* — Zachary Wilkes
(74) *Attorney, Agent, or Firm* — Leason Ellis LLP (57) ABSTRACT

A multi-ply mount (frame member) for displaying an image in a lenticular environment includes a lenticular sheet having lenticules. The lenticular sheet has a clear coating deposited on a portion of the front surface thereof. The clear coating at least substantially fills the valleys of the lenticules within the portion to form a filled region that defines a windowed region. A reverse-mounted image, such as a photograph, is disposed along and faces the back surface and is in registration with the windowed region resulting in the reverse-mounted image being viewable through the clear coating without lenticular distortion. A multi-layer backing structure seals the reverse-mounted image within the mount.

10 Claims, 5 Drawing Sheets

LENTICULAR PRODUCT

CROSS REFERENCE TO RELATED APPLICATIONS

This application is a continuation of U.S. patent application Ser. No. 12/753,133, filed Apr. 2, 2010, which is a continuation-in-part of U.S. patent application Ser. No. 12/142,976, filed Jun. 20, 2008, which claims the benefit of U.S. patent application Ser. No. 60/945,657, filed Jun. 22, 2007, each of which is hereby incorporated by reference in its entirety.

FIELD OF THE INVENTION

The present invention relates to lenticular products and, more particularly, to local surface modification of the patterned relief of a lenticular sheet for improving the rendering, readability, and detection of graphics such as (but not limited to) printed imagery, fonts, symbols, fine text, or bar codes.

BACKGROUND OF THE INVENTION

In the interest of a better understanding of the invention, certain conventions and practices within the trade may be appreciated.

Lenticular lenses, or lenticules, are typically cylindrical bodies having longitudinal axes and arranged in a parallel-axis array on a lenticulated face of a lenticular sheet. The face opposite the lenticulated face typically is substantially planar. Seen in cross-section, each lenticule has a vertex distal from the planar face, and adjacent lenticules intersect to define valleys proximal to the planar face. A lenticular height is defined between a first plane tangent to the lenticule vertices and a second plane tangent to the lenticule valleys. A lenticular pitch is defined between axes of adjacent lenticules along a raster axis perpendicular to the axes of the parallel lenticules.

The lenticular sheet typically is formed with a thickness of the sheet being substantially equal to a focal length of the cylindrical lenses or lenticules. The graphic resolution along the raster axis is then limited to the lenticular pitch. In the finished lenticular product, the planar face commonly carries a specially prepared and registered printed image. The image is most usually printed directly to the planar face of the sheet, but may also be formed on a separate substrate, and then aligned and adhered to the planar face.

A tradeoff between quality of focus and viewing angle is well known in the lenticular art. The influence of refractive index is also well understood. Lenticular sheets are often described according to the lenticular pitch in lenses per inch. A 150 lens-per-inch (LPI) array is colloquially understood to be a fine pitch. 75 LPI lens is considered an industry standard. A 40 LPI lens has a relatively coarse pitch, generally used for applications in which the lenticular item is to be viewed at greater than arm's length. The majority of commercial applications are currently served by lenticular sheets having proportions between 1.2 times as thick as the lenticular height, to twice as thick as the lenticular height.

A single lenticule of a 75 LPI lenticular sheet is about 339 microns (13 mils) wide from valley to valley. In its most common present commercial form, a 75 LPI lenticular sheet will have a refractive index of around 1.57 and a thickness of around 469 microns (18 mils), therefore being about 1.4 times as thick as the nominal lens width.

It may be understood that some applications have called for more extreme proportions, as when a thin, conformable lenticular label is required, in which case the proportion may be 1:1 or less. Conversely, superior optical resolving power is often sought after in autostereoscopic "3-D" display, and in this case the ratio of thickness to lens width may be 3:1 or greater. The preceding values descriptions are intended to characterize underlying principles, and identify the most readily available commercial materials in the current trade, and should not in any way be taken to limit the scope of the invention.

Lenticular sheets may be formed by any suitable method. For example, U.S. Pat. Nos. 5,330,799 and 5,554,532 to Sandor et al. describe a lenticular system in which lenses are formed upon a flat carrier sheet in a forming process which is commonly known as "cast film" lenticular. and or et al. describe lenses formed in local areas by forming and curing fluid material over the desired image areas.

However, the cast film process has proven costly and has not been widely adopted. Instead, high-speed extrusion is currently the prevalent practice in the trade. Extrudable polymer materials suitable for use within the invention include amorphous polyethylene (APET), or glycol-modified polyethylene terephthalate copolyester (PETG). Additionally, formulations of polycarbonate, acrylic, styrene, and other polymers can also be used to form the prefabricated lens array by extrusion. It is recognized that such thermoplastic polymer materials are also generally amenable to other manufacturing methods, such as embossing or various other molding and forming techniques.

High-speed extrusion is cost-efficient for large runs, but requires forming cylinders that are individually expensive. Thus, the extrusion method is not economically feasible for making customized layouts of lenticulated surfaces in any arbitrary combination with unlenticulated regions. Nevertheless, there are many applications for lenticular lenses in which an ability to provide such customized layouts would be advantageous. Although alternate manufacturing methods such as cast film and injection molding may be used to prefabricate a patterned combination of lenticulated surfaces and smooth optical windows, such methods increase the cost of the finished product above what is economically practicable.

In the practice of lenticular printing, it has been discovered that the ribbed cylindrical relief inhibits the accomplishment of certain common and regularly sought-after tasks within the field of printed graphics. For example, the optical effect of the lenticular overlay has a disadvantageous effect upon the accurate detection of encoded data. The material currently having the widest use in the trade has 75 cylindrical lenses per inch (LPI). This pitch is significantly broader than the resolution of conventional offset printing. Indeed, a human reader cannot discern fine text that has been visually expressed via the lenticular overlay, as the maximum resolution on one axis is characteristically constrained by the lens pitch. Analogously, in many cases bar codes cannot be correctly read, owing to distortions imparted by the many cylindrical lenses. Thus, it may be appreciated that it might be desirable to make text, graphics or other indicia visible at a higher linear resolution than can be achieved by viewing a printed image through the surface optics of a lenticular lens sheet.

A particular problem identified in the lenticular trade has been the method's historical incompatibility with bar coding. The fine lines used in the encoded data often exceed the resolution available in standardized lenticulated sheet. Prior solutions to this specific problem include the use of 150 LPI or finer lenses, as suggested in U.S. Pat. No. 6,424,467 to Goggins, or disposing the bar code so that the bars in the barcode are oriented in a crosswise direction, as in U.S. Pat. No. 6,974,080, also to Goggins.

However, in the invention described in U.S. Pat. No. 6,424, 467, such fine lenses are difficult to cost-effectively manage in a production environment. Furthermore, for a given optical design, the pitch of the lenticules and the thickness of the sheet are directly proportional. Therefore, end users often avoid lenses thinner than 75 LPI because, unless mounted in a frame or on a rigid substrate, such thin lenses are widely believed to be prone to unwanted flexure, a property which is known to disrupt the lenticular effect.

In U.S. Pat. No. 6,974,080, the magnification effects of the lenses are obviated only if the scanning device is held absolutely perpendicular to the lens sheet. It may therefore be appreciated that there remains a general desire both for more flexibility in the local optical features and resolution properties of lenticular sheet, and more particularly for improving the rate and reliability of the scanning of machine-readable optical indicia, such as bar codes.

SUMMARY OF THE INVENTION

In one embodiment, a multi-ply mount (frame member) for displaying an image in a lenticular environment includes a lenticular sheet having a back surface and a front surface. The front surface has lenticules defining vertices and valleys therebetween, wherein at least one select portion of the back surface has graphic material including an image. The lenticular sheet has a clear coating deposited on a portion of the front surface thereof.

The clear coating occupying less than the entire front surface of the lenticular sheet, thereby resulting in adjacent lenticules being free of coating. The clear coating at least substantially fills the valleys of the lenticules within the portion to form a filled region that defines a windowed region.

A reverse-mounted image, such as a photograph, is disposed along and faces the back surface. The reverse-mounted image is in substantial registration with the clear coating portion formed on the front surface resulting in the reverse-mounted image being viewable through the clear coating without lenticular distortion while the surrounding graphic material of the back surface that is viewable through the lenticules that are free of the clear coating exhibits a lenticular effect. The multi-ply mounted also includes a backing layer having a top edge joined to a top edge of the back surface of the lenticular sheet; an adhesive layer formed on one face of the backing layer that faces the back surface of the lenticular sheet; and a release liner removably adhered to the adhesive layer.

Once the reverse-mounted image is introduced into the windowed region in a desired orientation, the release liner is removed. The multi-ply mount is then sealed by bonding part of the backing layer to the reverse-mounted image, and the remainder of the backing layer to a border region of the back surface that contains the graphic material.

These and other objects, features and advantages of the present invention will become apparent in light of the detailed description of the best mode embodiment thereof, as illustrated in the accompanying drawings.

DETAILED DESCRIPTION OF PREFERRED EMBODIMENTS

Figure 1:
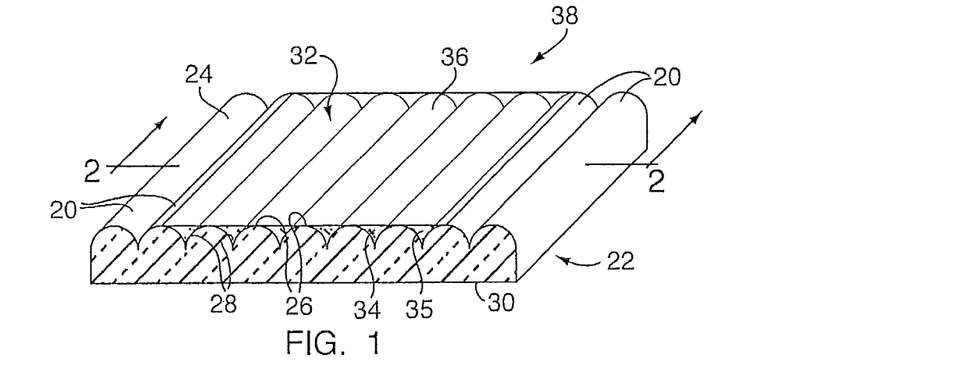
FIG. 1 is a perspective view of a lenticular product in which a lenticular sheet has been optically modified by depositing a coating on a portion of the lenticulated surface so as to provide an effectively flat window in a plane coincident with the vertices of the lenticules in the array, according to one embodiment of the present invention.

In view of the foregoing discussion of the art and the summary of the invention, and referring now to the drawings and the specifics particular to the present invention, FIG. 1 shows a plurality of lenticules 20 formed on a transparent lenticular sheet 22. The plurality of lenticules 20 are arrayed in parallel to form a lenticulated surface 24 having vertices 26 and valleys 28. The lens sheet also includes an unpatterned surface 30. The unpatterned surface 30 is most typically planar, but may also be curved around one or more axes if the transparent lenticular sheet 22 itself is contoured conformally to a cylindrical, conical, or other achievable geometrical shape.

In FIG. 1, a portion 32 of the lenticulated surface 24 has been modified by depositing an amount of a substantially clear coating 34 sufficient to fill the valleys 28, thereby forming a filled region 35 having a surface 36 that is substantially tangent to the vertices 26 of the lenticules 20.

If the coating 34 is a 100% solids radiation curable adhesive, subjected to actinic radiation, it may be understood that the curing process will result in the surface 36 being substantially flat, as there should be substantially no loss in material volume in the curing stage. Once the coating 34 is cured, the process results in a windowed lenticular product 38.

Figure 2:
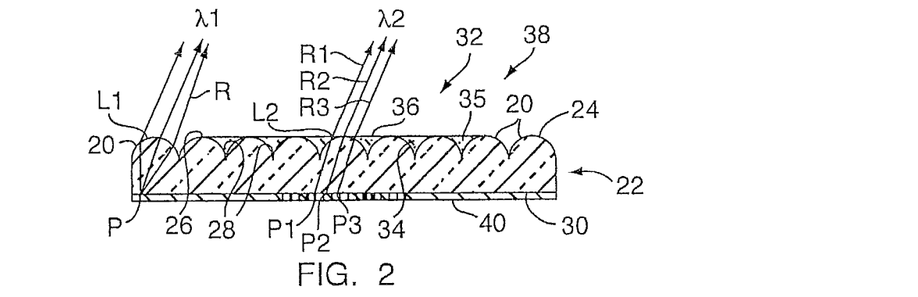
FIG. 2 is a sectional view showing an optical nulling effect that occurs when the lenticular sheet and the coating of FIG. 1 are chosen to have a common refractive index.

FIG. 2 demonstrates the optical results of the arrangement exemplified in FIG. 1. Varied graphic material 40 has been disposed upon the unpatterned surface 30 of the windowed lenticular product 38. Light departing from a lenticule L1 expresses a conventional lenticular effect; namely, light radiated diffusely from a point P is significantly brought into near parallelism, as arrows indicate at 1, by the influence of the lenticular optic 24.

Given any variation in the graphic material underlying an individual lenticule 20, this controlled steering of light causes the appearance of the observed lenticule 20 to vary with the observer's angle of view. The color and tone present at the point P are optically spread over the most part of the lenticule aperture. This may be a desired effect in some part of an image, and expressly imparted at the expense of back plane resolution. However, the same property may be considered disadvantageous in another region with differing graphical or physical requirements.

In addition to the direct diminishment of attainable resolution, in any practicable lenticular system there is a significant amount of aberration owing to the intrinsic geometry of the simple lenses. In actual detection of the light transmitted from the lens, irrespective of whether that detection is by a living observer or electronic device, there will be mapping errors, which cause a shortfall of ideal point-to-point data correspondence. Skewed marginal ray R suggests one such mapping error. It may therefore be appreciated that both magnification and aberration can contribute to the precise and reliable observation or detection of data.

In contrast, it may be seen by light at λ2 that there is a direct and reliable mapping of points P1, P2, and P3 into parallel paths R1, R2, and R3. Because the effect of lenticule L2 had been expressly undermined by the application of transparent coating 34, there is no skewing of rays and the regular property of the set of rays is preserved.

Figure 3:
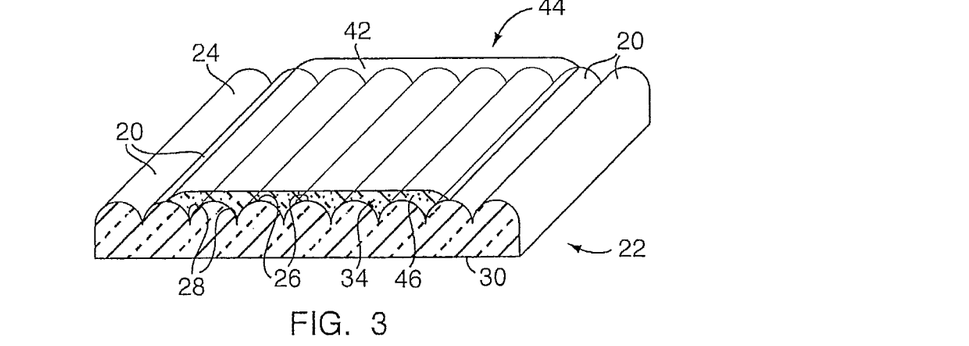
FIG. 3 is a perspective view of a lenticular product in which a lenticular sheet has been optically modified by depositing a coating on a portion of the lenticulated surface so as to provide an effectively flat window in a plane elevated above the vertices of the lenticules, according to another embodiment of the present invention.

FIG. 3 shows a variation of the invention in which a substantially planar raised window surface 42 has been created somewhat above the linear lenticule vertices 26 to create a raised-window lenticular product 44. Raised resin field 46 is composed of curable coating 34 and includes substantially flat land 42.
12

Such a variation may be imparted by, for example, employing for the coating 34 a resin, which in its fluid state exhibits a relatively higher viscosity than the resin used for coating 34 as depicted in FIG. 1. It may also be promoted by using a relatively lower viscosity resin, while increasing effective surface tension through the application of an electrostatic field. In any case, the invention should be understood to include a raised field of material, and not simply a level filling of the valleys 28 between the lenticules 20.

Figure 4:
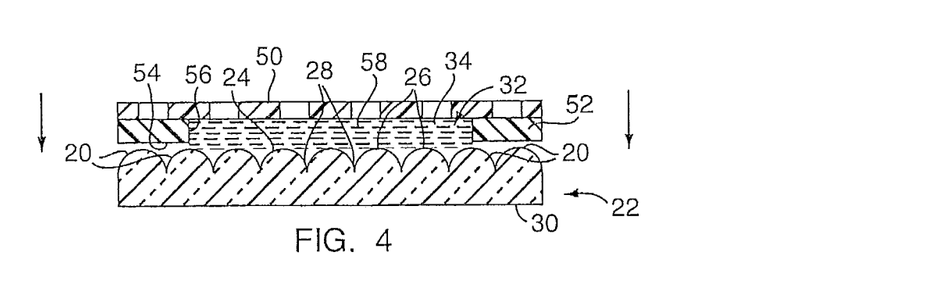
FIG. 4 is a sectional view of a printing screen carrying a mask of a predetermined design being used to deposit the coating on the lenticular sheet of FIG. 1 or FIG. 3.

FIG. 4 illustrates one method of applying the coating 34. Concurrent reference may also be made to FIG. 5. An apertured printing screen 50 is furnished with a mask 52. The mask 52 has a face 54 and an inner sidewall 56, and allows permeation of coating 34 in fluid form through the screen 40 in a predetermined area corresponding to the portion 32 of the lenticulated surface 24, while blocking fluid permeation elsewhere. The mask 52 can be formed of any suitable material, but is advantageously chosen to be of sufficient thickness and resiliency so as to adaptively conform to the lenticules 20, particularly the valleys 28. A higher degree of conformability in the mask 52 generally results in less bleeding of the fluid coating 34 beyond the masked portion 32 of the lenticulated surface 24.

Figure 5:
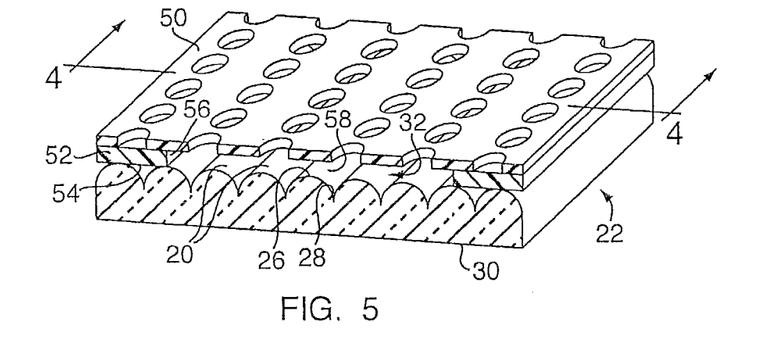
FIG. 5 is a perspective view of the screen and mask assembly of FIG. 4 in intimate contact with the lenticulated sheet.

Prior to applying the fluid coating 34, the mask face 54 is disposed in a plane parallel to the plane of the linear lenticule vertices 26, and then brought to bear against the lenticules 20 of the lenticular sheet 22, as suggested by the bold arrows in FIG. 4, and by the completed arrangement shown in FIG. 5. The apertured printing screen 50 operates cooperatively with the mask 52, and particularly with the mask sidewall 56, to define a well 58 into which the fluid coating 34 may be introduced in a controlled manner.

The coating 34 is then introduced in fluid form through the screen 50 into the well 58 defined by the mask 52, using force typically imparted by a blade or roller (not shown). Once the well 58 is acceptably filled, the screen 50 and the mask 52 are removed from intimate contact with the lenticules 20. The coating 34 is then actively or passively brought to a cured (solid) state, thus forming a clear optical window from the portion 32 of the lenticulated surface 24 to the unpatterned surface 30.

Figure 6:
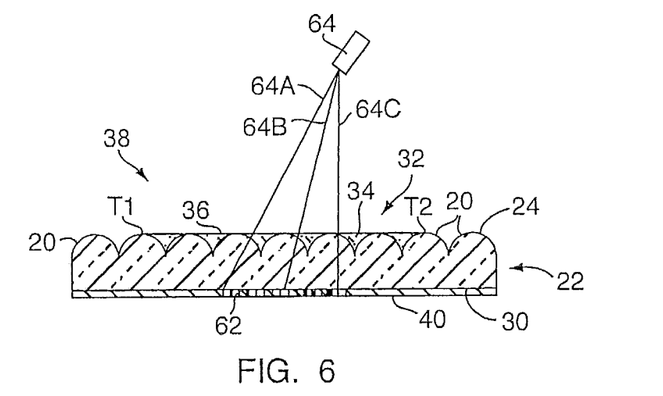
FIG. 6 is a sectional view of a scanning device used in conjunction with the lenticular product of FIG. 1 or FIG. 3 to reliably read coded data at a range of angles.
Figure 7:
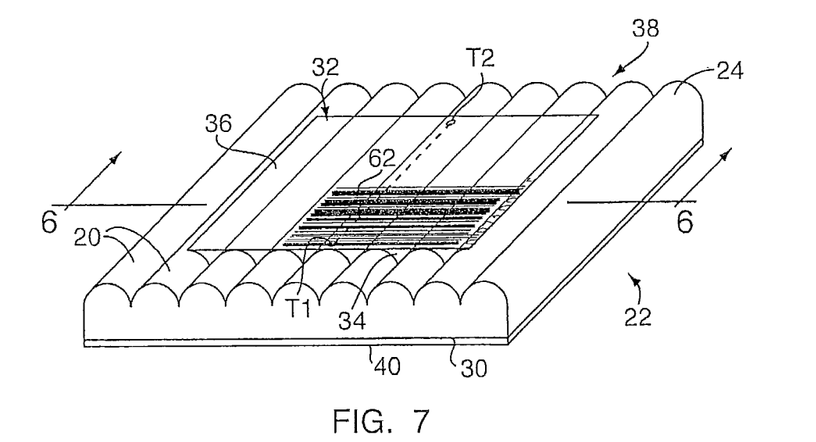
FIG. 7 is a perspective view of an article comprising a lenticular product having a substantially flat window formed on a lenticular sheet, the planar face of the sheet being furnished with a barcode, in which the bars are disposed transverse to the axes of the lenticules.
Figure 8:
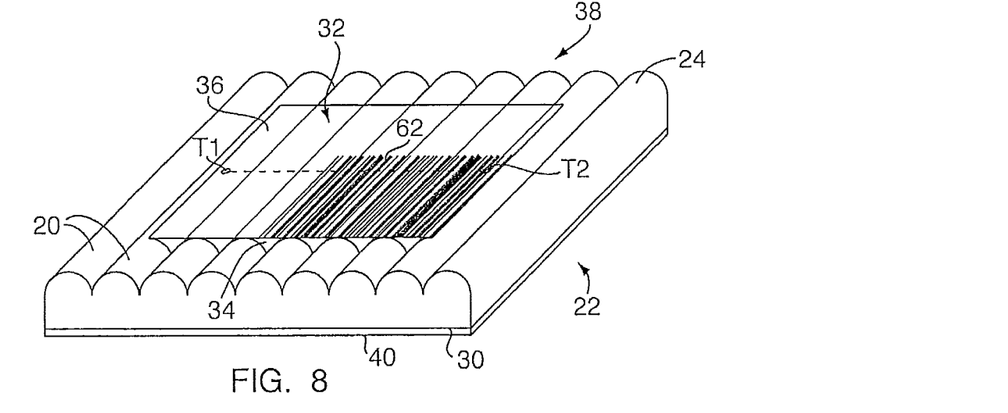
FIG. 8 is a schematic perspective view of a lenticular product having a substantially flat window formed on a lenticular sheet, a planar face of the sheet being furnished with a barcode, in which the bars are disposed parallel to the axes of the lenticules.

An underlying principle of the practice of the invention was depicted in FIG. 2. FIGS. 6-8 illustrate embodiments of the invention in which the graphical material 40 is presented at the back surface 30 of the lenticular lens 22 and includes graphical data 62 encoded as a series of bars of varying width and spacing, as in a bar code. In the schematic diagram in FIG. 6, optical scanner 64, which may include a collimated light source such as a diode laser, scans across a targeted region that includes the encoded graphical data.

Three beam paths are illustrated, 64A, 648, and 64C, to suggest the travel of the beam across the targeted region during the scanning process. Locations T1 and T2 represent the extremes of the beam scan at the window surface 36.

It may be appreciated from the drawing that in this use of the present invention the spatial proportionality of the bar widths is preserved, and that the reading device 64 will therefore return a high degree of reliability and repeatability. It should be noted that, absent the window surface 36, any degree of obliquity in the scanner beam relative to the lenticulated surface 24 resulted in distortion of the underlying image and misreading of the encoded data.

The versatility of the invention is further illustrated in FIG. 7 and FIG. 8. FIG. 7 shows exemplary applications in which the bars in the bar code 62 are disposed in an orientation transverse to the orientation of the longitudinal cylindrical axes of the lenticules 20. Scanning beam termini T1 and T2 identify the effective traverse of the scan necessary to obtain the encoded data.
14

FIG. 8 shows a complementary case in which the bars in the encoded region 62 are disposed in an orientation parallel to the orientation of the longitudinal cylindrical axis of the lenticules 20. Because the portion 32 of the lenticulated surface 24 modified according to the invention provides the window surface 36, it may be appreciated that the invention allows indicia such as bar codes 62 to be assessed by an optical scanning device (not shown) in a manner analogous to that achieved in the scanning of a clear-coated printed product. The reliability rates of scanning bar codes 62 in this application therefore approximate the high reliability encountered in any conventional, unlenticulated printed product.

FIGS. 9-12 show alternate embodiments of the invention, which provide further surface qualities and enhancements of visual quality. Throughout FIGS. 9-12, the principle of the invention is extended to a two-step resin application sequence.

Figure 9:
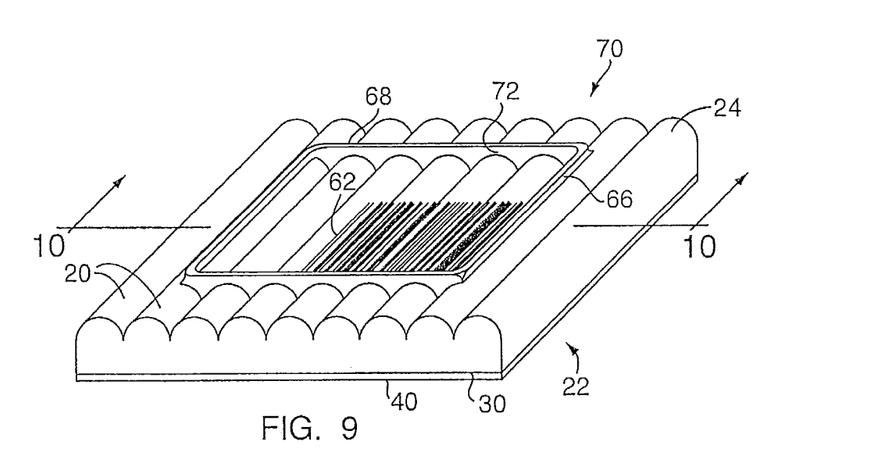
FIG. 9 is a perspective view of a lenticular sheet upon which a perimeter coating has been applied by screen printing to form a perimeter.

Referring now to FIG. 9, a resin application method such as screen printing has been employed to deposit a perimeter coating 66 in the pattern of a quadrilateral perimeter dam 68 upon the lenticulated surface 24 of lenticular sheet 22, preparatory to forming a two-stage windowed lenticular product 70. The perimeter coating 66 may have a relatively high viscosity upon application. It may be appreciated that resins in a gel state, or near gel state, can attain intimate surface contact with the lenticular sheet 22, while also retaining a high level of relief detail without immediate flow-out.

Figure 10:
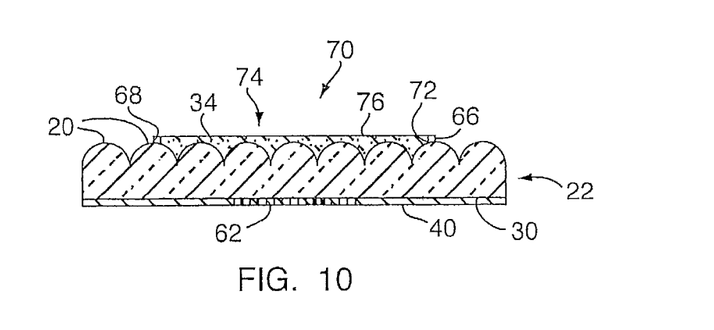
FIG. 10 is a sectional view of the perimeter of FIG. 9 having been filled to level by depositing a coating.

FIG. 10 shows a sectional view of the same region after subsequent deposition of the coating 34 into a well 72 defined by quadrilateral perimeter dam 68. In FIG. 10, the coating 34 is chosen to have relatively low viscosity, and as such can provide a filled region 74 of substantially uniform thickness having a substantially smooth and glossy window surface 76. It may be appreciated that an exceptionally low viscosity coating 34 typically imparts a particularly flat and glossy surface 76. The two-stage windowed lenticular product 70 can therefore include a particularly high quality optical window.

The combination of materials that can attain this effect is diverse. An example of a resin that can be formulated to have a relatively high viscosity is Dymax™ OP-29 Series Optical Adhesive, available from DYMAX Corporation of 318 Industrial Lane, Torrington, Conn. OP-29 Series Optical Adhesive is available as an uncured liquid resin over a viscosity range from about two thousand five hundred to about twenty thousand (2,500 to 20,000) centipoises. An example of a fluid resin of relatively low viscosity is Light-Lok™ 492, available from National Adhesives of 10 Finderne Avenue, Bridgewater, N.J., which exhibits a relatively low viscosity of eight hundred (800) centipoises in its uncured state.

The process described above need not be limited to a level meniscus; positive and negative menisci are within the scope of the process. Furthermore, the process is not limited to particular perimeter shapes such as the exemplary level or rectilinear contours shown in some preceding figures.

Figure 11:
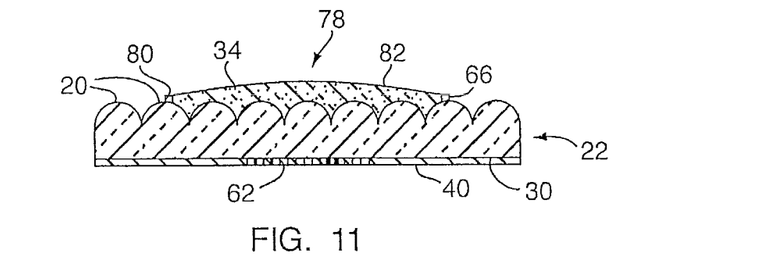
FIG. 11 is a sectional view of the perimeter of FIG. 9 having been overfilled with a coating to form a convex lens surface.
Figure 12:
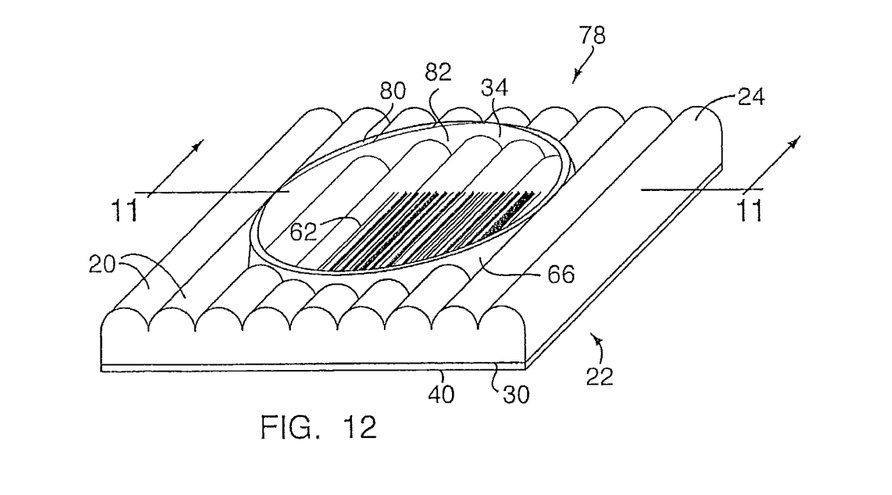
FIG. 12 is a perspective view of a perimeter compatible with the convex lens surface of FIG. 11.

Accordingly, FIG. 11 and FIG. 12 show embodiments of the present invention in which the perimeter and/or the central filled area are devised to be continuously curved to provide a superposed lens lenticular product 78. A circular perimeter dam 80 is composed of the perimeter coating 66, which has been disposed in a circular geometric pattern upon the lenticular sheet 22. The fill coating 34 is deposited within the perimeter 80 to form a positive, i.e. convex, meniscus. The coating 34 is then cured to form superposed lens surface 82.

Curing the resins results in a permanent superposed relief feature that can have optical properties apart from those implicit in the conventional lenticular structure. For example, apart from previously noted advantages of the invention, such a convex feature can provide an independent magnification property, which provides visual interest beyond that shown by the fundamental background lenticular effect.

It may be understood by the foregoing discussion and description that the present invention provides a range of novelties that can provide functional and visual effects. Although this invention has been shown and described with respect to the detailed embodiments thereof, it will be understood by those skilled in the art that various changes in form and detail thereof may be made without departing from the spirit and the scope of the invention. There are many variations and extensions of the invention, which are too many to be listed or detailed here in their entirety.

The invention is not intended to be limited in scope by the scale, proportion, or optical prescription of the lenticular lenses 20. Lenticular sheets of any pitch are suitable for use in the invention, although it may be appreciated that the volume of fluid material needed to substantially fill the valleys between the lenticules may inform the choice of material and a compatible curing strategy. Factors that may affect such a choice may include solvent evaporation, penetration of curing radiation such as UV light or electron beam energy, or surface tension, all of which may impart scale-related effects.

For further example, the coating or coatings 34, 66 deposited on the modified portion 32 may be formulated and cured to a state with residual tack, so that the function of the modified area is not primarily optical, but instead serves to provide a pressure-sensitive region so that, for example, an uncoated sheet material may be applied as a label to the surface. A label applied to a flat region may be reversibly or removably applied, and may have printing beneath which is revealed upon removal as in a lottery "scratch card". A planar window cured to a relatively hard state can be used as a reliable bearing surface for a gummed or self-adhesive label, including those printed with bar coded data. The locally flat surface can bear a removable printed material.

The modified portion 32 need not be used only for viewing reverse-printed graphic matter, as in the conventional lenticular printing practice, but can also provide a surface amenable to face printing upon an otherwise unreceptive lenticulated surface. The face-printed region can have a higher resolution than that exhibited throughout the lenticulated region or regions, irrespective of whether the printing is located on the reverse of the lenticulated side of the sheet, or directly upon the area modified by the application of resin. If two resins are used successively, they may be cured separately, or in a common curing phase. Differing variations of the invention may be combined in one sheet of material.

Although for clarity of description, the perimeter is shown herein as having an effectively constant dimension, in practice, width of the perimeter dam need not be uniform about the perimeter. Indeed, the inner periphery of the perimeter dam can suffice to retain the clear coating and to delimit the filled region 74 or the lens surface 82, while the outer periphery or contour of the perimeter dam can be freely devised to form a larger pattern of widely varied design. As a simple example, an alternate version to the raised circular feature shown in FIGS. 11 and 12 might be formed having the same circular inner periphery, but might be devised in its outer periphery to exhibit a raised, surrounding contour pattern of radiating rays.

As another example, the perimeter need not be a completely or substantially closed curve, but can be an open curve, arc, or segment such that the clear coating can at least minimally flow outward from an opening of the perimeter dam. It is understood that in theory a refractive index match is necessary for a complete removal of the optical boundary between the prefabricated lenticules and the applied resin, however, it has been found that a perfect match is not essential for the successful application of the invention. It should also be appreciated that a coating in a fluid state usually will exhibit a different, typically lower, refractive index than in its final cured state. These parameters are well understood, and neither of these factors should be taken to limit the practicability or utility of the invention.

The graphic material may be prepared and composed in diverse ways well known to those practiced in the art. Since in the interest of brevity it is impossible to describe all the accumulated knowledge in the graphic arts, or even within lenticular printing, it may be said generally that no previously known preparation, composition, or disposition of graphic matter for either lenticular or conventional printing, either alone or in combination, should be taken to be unanticipated by the present invention.

Figure 13:
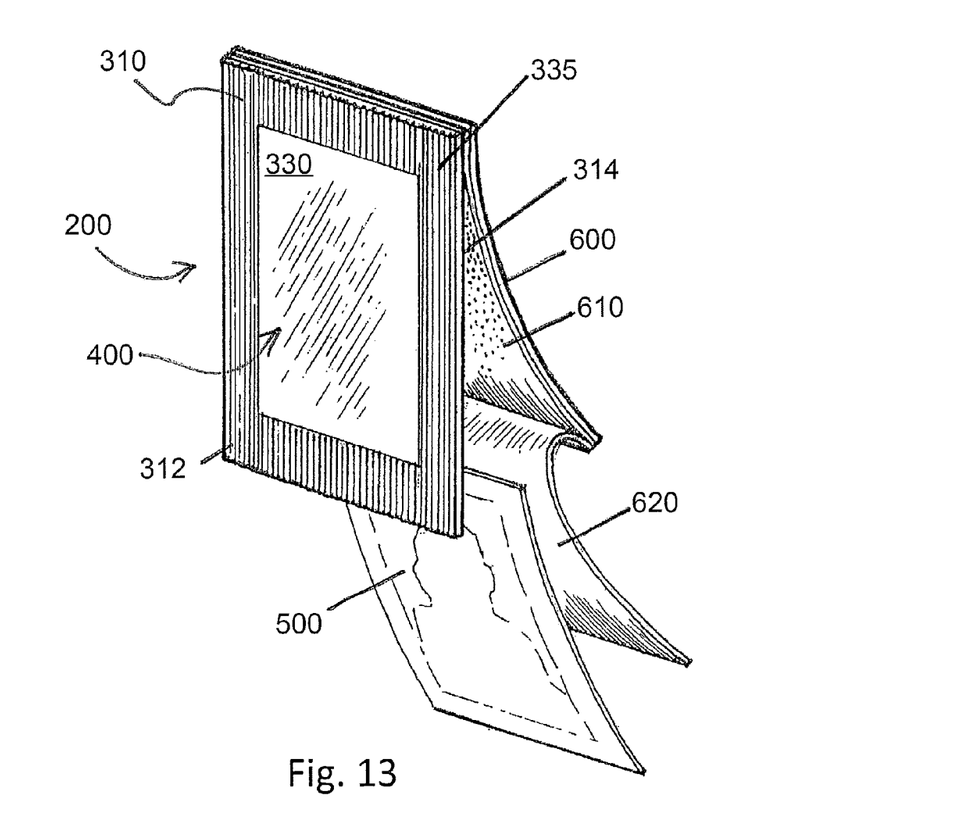
FIG. 13 is a perspective view of a lenticular product according to another embodiment of the present invention.
Figure 14:
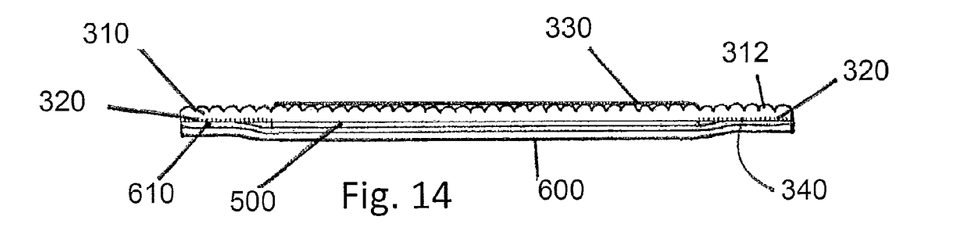
FIG. 14 is a cross-sectional view of the lenticular product of FIG. 13.

Now turning to FIGS. 13-14 in which another embodiment of the present invention is illustrated and in particular, FIGS.

13-14 relates to a particular application of the invention having specific graphic and structural properties, with the lenticular product being identified at 200.

Conventionally, a lenticular sheet is printed on its planar reverse side using a specially prepared image interlaced at a pitch substantially commensurate with the pitch of the lenticules formed in the lenticular sheet. The interlaced image may be a single pass, but more often includes the registered printing of a series of color separations. Additionally, printing by image-carrying plates may be followed by one or more layers of opaque colorant, such as a white ink. This provides a diffusely reflective background for the composite image.

In the extension of the invention, a lenticular sheet 310 is provided and includes a front side 312 and an opposing rear (reverse) side 314. The lenticular sheet 310 is provided with interlaced printing 320 only in an elected portion of the sheet (i.e., select portions of the reverse side 314). In the illustrated embodiment, the interlaced printing 320 is located along the periphery of the lenticular sheet 310 and in particular, the interlaced printing 320 is formed along the four sides of the sheet 310. The interlaced areas 320 can also, if desired, be selectively and correspondingly coated with an opaque colorant such as white ink. However, the balance of the lenticular sheet 310 is left substantially free of printing. For example, in the embodiment illustrated in FIG. 13, the center area (rectangular shaped) of the reverse side 314 of the lenticular sheet 310 is free of printing.

Owing to the transparency of the polymer, and to the planar geometry of the back face (reverse side 314) of the lenticulated sheet 310, the rear optical interface will not diffuse light passing through the sheet 310. However, the refractive relief at the lenticulated air/polymer interface will cause light passing through to be highly diffused. Therefore, any conventional image placed behind an unmodified lenticular sheet will have a coarse, diffused appearance.

The present invention is constructed to selectively subvert the convergent effect of the lenticules, so that one or more planar regions are created upon the underlying lenticular relief. This effect is provided by the conscientious and selective application of a clear coating 330. This method leaves regions that mimic the optical behavior of a flat, optically clear film directly adjoining regions that behave as the lenticular sheet.

Furthermore, in accordance with this embodiment, a region 340 on the reverse side 314 of the sheet 310 corresponding to uncoated lenticules is provided with interlaced image material 320, so that a variable optical effect may be observed from the front of the image. This interlaced image material 320 can subsequently be provided with an opaque colorant, if desired, in a similarly selective manner.

The clear coating 330 upon regions of the lenticulated surface serves to locally undermine the convergent effect of the lenses. In this extension, the planar reverse side 314 immediately corresponding to the clear coating 330 is expressly left substantially free of any opaque colorant.

The combination of selective clear coating 330 upon the front side 312 of the sheet 310 with this arrangement of corresponding selective printing 320 on the reverse side 314 leaves a dedicated region that is optically clear. The intentional combination of a clear coating 330 having a particular contour with an open area delimited by a printed, graphically interlaced surround defines an effective window, generally indicated at 400, in the polymer sheet 310.

The aforementioned construction can be used to create a picture frame providing a lenticular effect (interlaced printing 320) with a windowed area 400 suitable for use with a reverse-mounted image such as a photograph 500. The invention additionally provides for an image mount that can use a multi-ply self-adhesive construction.

FIG. 13 shows a perspective view of such an image mount (lenticular product 200). The lenticular sheet 310 has been selectively coated so that it includes a clear-coated area (where the clear coating 330 is located) and an uncoated area 335. An initially separate backing layer 600 carries a pressure-sensitive adhesive (PSA) 610 and a release liner 620. The release liner 620 prevents premature lamination of the components.

In FIG. 13, a strip of the release liner 620 along the top edge of the backing sheet 600 has previously been removed, and the backing layer 600 joined, along that top edge only, to the lenticular sheet 310. The image mount 200 would typically be provided to the user with a preprinted border providing a variable lenticular effect, and with the preponderance of the release liner 620 still in place upon the PSA.

The user would deflect the backing layer 600 away from the lenticular sheet 310 while introducing a selected image (photograph 500) into the windowed region 400. Once the desired position with respect to the window 400 was observed, the remaining larger portion of the release liner 620 would be removed, as shown in the figure. The user-supplied picture (photograph 500) would then be sealed by pressure upon the multi-ply assembly, bonding part of the backing layer 600 to the photograph 500, and the remainder of the backing layer 600 to the border region of the rear face (reverse side 314) of the lenticular sheet 310.

The picture (photograph 500) is thereby sealed inside the image mount 200 that provides a visually active lenticular surround. The visually variable frame 200 can provide diverse effects and themes, including color shifts, animations, transformations, and various spatial illusions.

FIG. 14 shows a completed package (frame 200) consistent with the teachings of this embodiment of the present invention. It may readily be seen by this sectional view that the clear-coated area 330 on the lenticulated side (sheet 310) of the array corresponds to the location of the inserted image (photograph 500). The user-supplied image (photograph 500) can therefore be seen without the intrusion of an undesirable diffusing effect that is associated with the uncoated lenticules. In the uncoated border areas 335, however, the remaining lenticulated surface is combined with the placement of interlaced printing 320 to provide a visually active appearance.

The multi-ply (frame 200) provides many benefits. In addition to visual effect, the package (frame 200) protects the enclosed image (photograph 500) from degradation by folding or other marring. Many variations of the features of this embodiment of the invention are envisioned. For example, because the apparent frame 200 is provided by a printing process, the contour may readily be conformed to more complex shapes than the rectangle shown, Furthermore, the reverse printing 320 can extend into the clear coated area 330, and may imitate effects such as matting or vignetting, or may include partially transparent printed effects such as guilloches or filigree. The contour of the frame 200 can also be expressly devised to correspond to interlaced image content 320 located behind the remaining uncoated lenticular regions 335.

In one example of the frame 200, the interlaced printing 320 can be in the form of a sports stadium that is displayed with a lenticular effect due to the uncoated lenticules being formed over the interlaced printing 320. A photograph 500 of a person can then be inserted into the frame 200 and due to the clear coated area 330 overlying the photograph 500, the net effect is that the individual is displayed with no lenticular effect, while the surrounding sports stadium is shown with lenticular effect.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A multi-ply mount for displaying an image in a lenticular environment comprising:
   a lenticular sheet having a back surface and a front surface, the front surface having lenticules defining vertices and valleys therebetween, wherein at least one select portion of the back surface has graphic material including an image;
   a clear coating deposited on a portion of the front surface that is less than the entire front surface, thereby resulting in adjacent lenticules being free of coating, the clear coating at least substantially filling the valleys of the lenticules within the portion to form a filled region that defines a windowed region;
   a reverse-mounted picture that is physically discontinuous from the graphic material disposed on the back surface of the lenticular sheet, wherein the reverse-mounted picture is in substantial registration with the clear coating portion formed on the front surface resulting in the reverse-mounted picture being viewable through the clear coating without lenticular distortion while the surrounding graphic material of the back surface that is viewable through the lenticules that are free of the clear coating exhibits a lenticular effect;
   a backing layer having a top edge joined to a top edge of the back surface of the lenticular sheet, wherein the reverse-mounted picture is disposed on the backing layer which serves as a discrete carrier for the reverse-mounted picture;
   an adhesive layer formed on one face of the backing layer that faces the back surface of the lenticular sheet; and
   a release liner removably adhered to the adhesive layer;
   wherein once the reverse-mounted picture is introduced into the windowed region in a desired orientation so as to be disposed along and face the back surface of the lenticular sheet, the release liner is removed and the multi-ply mount is sealed by bonding part of the backing layer to the reverse-mounted picture, and the remainder of the backing layer to a border region of the back surface that contains the graphic material.

2. The multi-ply mount of claim 1, wherein the clear coating is entirely surrounded by uncoated lenticules so as to define a frame.

3. The multi-ply mount of claim 1, wherein the graphic material is formed along the periphery of an outer edge of the back surface of the lenticular sheet, with the windowed region being defined therebetween.

4. The multi-ply mount of claim 1, wherein the reverse-mounted picture comprises a photograph.

5. The multi-ply mount of claim 1, wherein the adhesive layer comprises a pressure-sensitive adhesive layer.

6. The multi-ply mount of claim 1, wherein the reverse-mounted picture is separate and removable from the assembled lenticular sheet, backing layer, adhesive layer and the release layer.

7. The multi-ply mount of claim 1, wherein in a pre-assembled condition, the release liner is removably bonded to at least a substantial portion of the backing layer so as to protect the adhesive layer formed on the backing layer and form a joined backing structure that is pivotally movable relative to the lenticular sheet so as to permit the reverse-mounted picture to be received between the back surface of the lenticular sheet and the joined backing structure.

8. The multi-ply mount of claim 1, wherein the graphic material that exhibits the lenticular effect completely surrounds the reverse-mounted picture.

9. The multi-ply mount of claim 1, wherein the reverse-mounted picture has a surface area less than a surface area of the back surface of the lenticular sheet and less than a surface area of a front surface of the adhesive layer that bonds to the back surface of the lenticular sheet.

10. A method for forming a multi-ply mount for displaying an image in combination with a surrounding lenticular environment comprising:
    providing a frame member that includes:
       a lenticular sheet having a back surface and a front surface, the front surface having lenticules defining vertices and valleys therebetween, wherein at least one select portion of the back surface has graphic material including an image;
       a clear coating deposited on a portion of the front surface that is less than the entire front surface, thereby resulting in adjacent lenticules being free of coating, the clear coating at least substantially filling the valleys of the lenticules within the portion to form a filled region that defines a windowed region;
       a backing layer having a top edge joined to a top edge of the back surface of the lenticular sheet;
       an adhesive layer formed on one face of the backing layer that faces the back surface of the lenticular sheet; and
       a release liner removably adhered to the adhesive layer;
    disposing a reverse-mounted picture along the back surface of the lenticular sheet, wherein the reverse-mounted image is physically separate from the lenticular sheet and lies in a different layer relative to the graphic material of the lenticular sheet and is physically discontinuous from the graphic material, the reverse-mounted picture being placed in substantial registration with the clear coating portion formed on the front surface resulting in the reverse-mounted picture being viewable through the clear coating without lenticular distortion while the surrounding graphic material of the back surface that is viewable through the lenticules that are free of the clear coating exhibits a lenticular effect; and
    sealing the reverse-mounted picture within the frame member by removing the release liner and bonding part of the backing layer to the reverse-mounted picture, and the remainder of the backing layer is bonded to a border region of the back surface that contains the graphic material.

* * * * *